Oct. 16, 1951          L. R. UHLAND          2,571,502
                    FOLIAGE REMOVAL BUCKET
Filed June 24, 1949                    3 Sheets-Sheet 3

Inventor
Lyle R. Uhland
By
Webster & Webster
ATTORNEYS

Patented Oct. 16, 1951

2,571,502

UNITED STATES PATENT OFFICE 2,571,502

FOLIAGE REMOVAL BUCKET

Lyle R. Uhland, Knights Landing, Calif.

Application June 24, 1949, Serial No. 101,104

11 Claims. (Cl. 56—8)

This invention is directed to, and it is an object to provide, a clamshell type dredge bucket especially designed, but not limited, for use to cut and remove foliage such as tules, cat-tails, large weeds, and aquatic growth from irrigation ditches, canals, or the like.

Another object of the invention is to provide a foliage removal bucket which is adapted to be cable-suspended from the boom of a crane or drag-line implement disposed adjacent and for movement along one bank of the irrigation ditch or canal; the bucket being adapted to be controlled from, and by the operator of, the implement.

A further object of the invention is to provide a clamshell type bucket, for the purpose described, which includes bucket halves movable forcefully between open and closed positions by fluid pressure actuated cylinders connected in novel assembly with said bucket halves.

An additional object of the invention is to provide a foliage removal bucket having power actuated foliage cutters associated therewith in novel manner; such cutters comprising sickle bars mounted on the lower edges of the bucket halves so as to sever the bottom of foliage embraced by each bite of the bucket whereby to assure of clean removal of the foliage from the irrigation ditch or canal.

It is also an object of the invention to provide a foliage removal bucket, as in the preceding paragraph, wherein the bucket-mounted cutters are driven by novel mechanism including an engine mounted on the top frame of said bucket.

A still further object of the invention is to provide a practical and reliable foliage removal bucket, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged fragmentary sectional elevation of the driving connection for one sickle bar.

Figure 1:
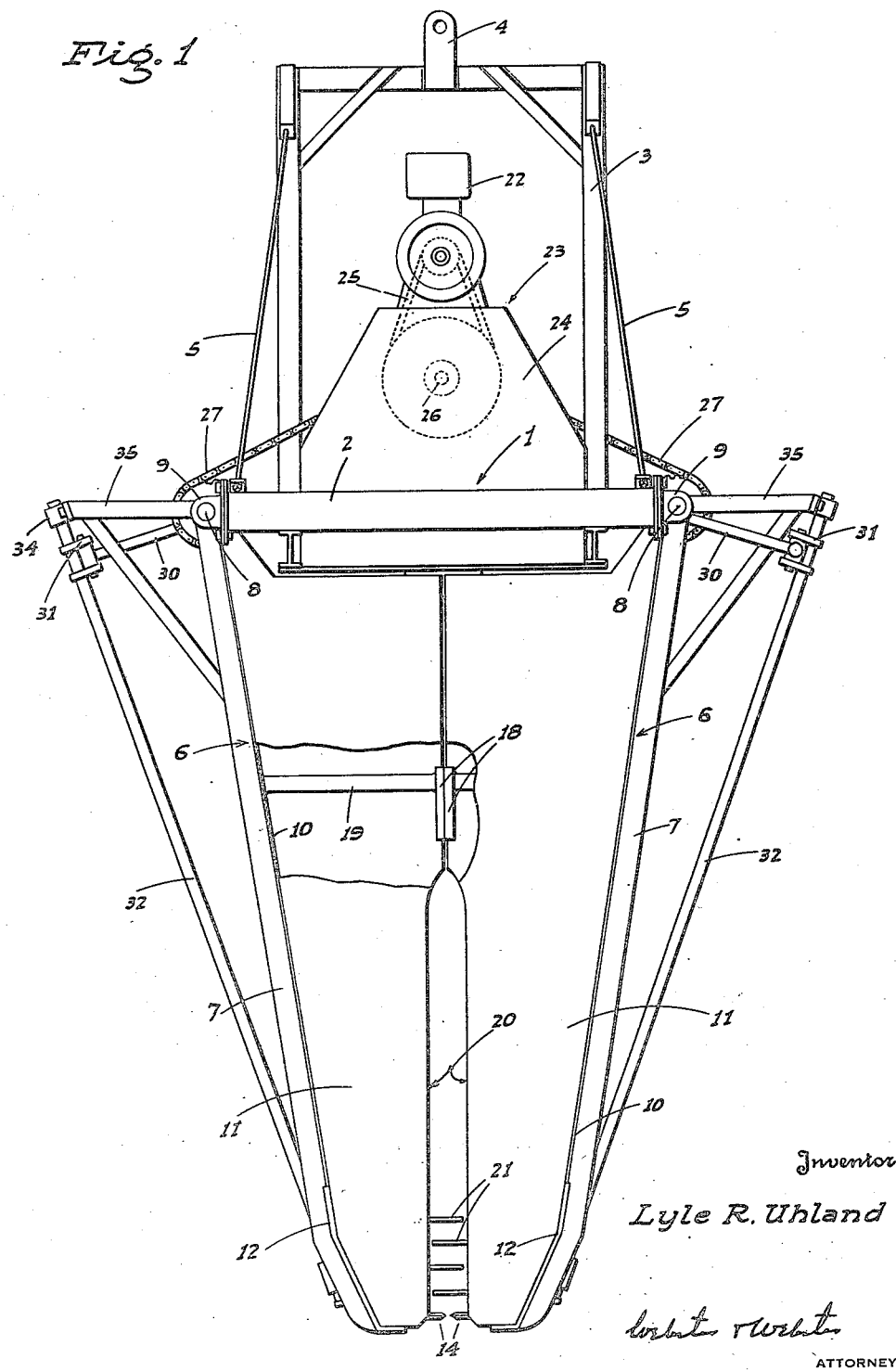
Fig. 1 is an end elevation of the bucket in closed position.

Referring now more particularly to the characters of reference on the drawings, the novel, foliage removal bucket comprises a generally horizontal top or suspension frame 1 of elongated rectangular construction; such suspension frame 1 including a plurality of spaced cross beams 2 which extend beyond opposite sides of said frame for the purpose hereinafter described.

The suspension frame 1 is formed, centrally of its ends, with an upstanding lift frame 3 which includes a top link 4 adapted to be connected to a suspension cable vertically adjustably depending from the outer end of the boom of a crane or drag-line implement (not shown), which implement is adapted to travel along or adjacent the bank of an irrigation ditch or canal to be cleaned of undesirable foliage.

The upstanding lift frame 3 is stabilized by suitable braces 5. Both the suspension frame 1 and the lift frame 3 are of skeleton type whereby to minimize their weight.

Figure 2:
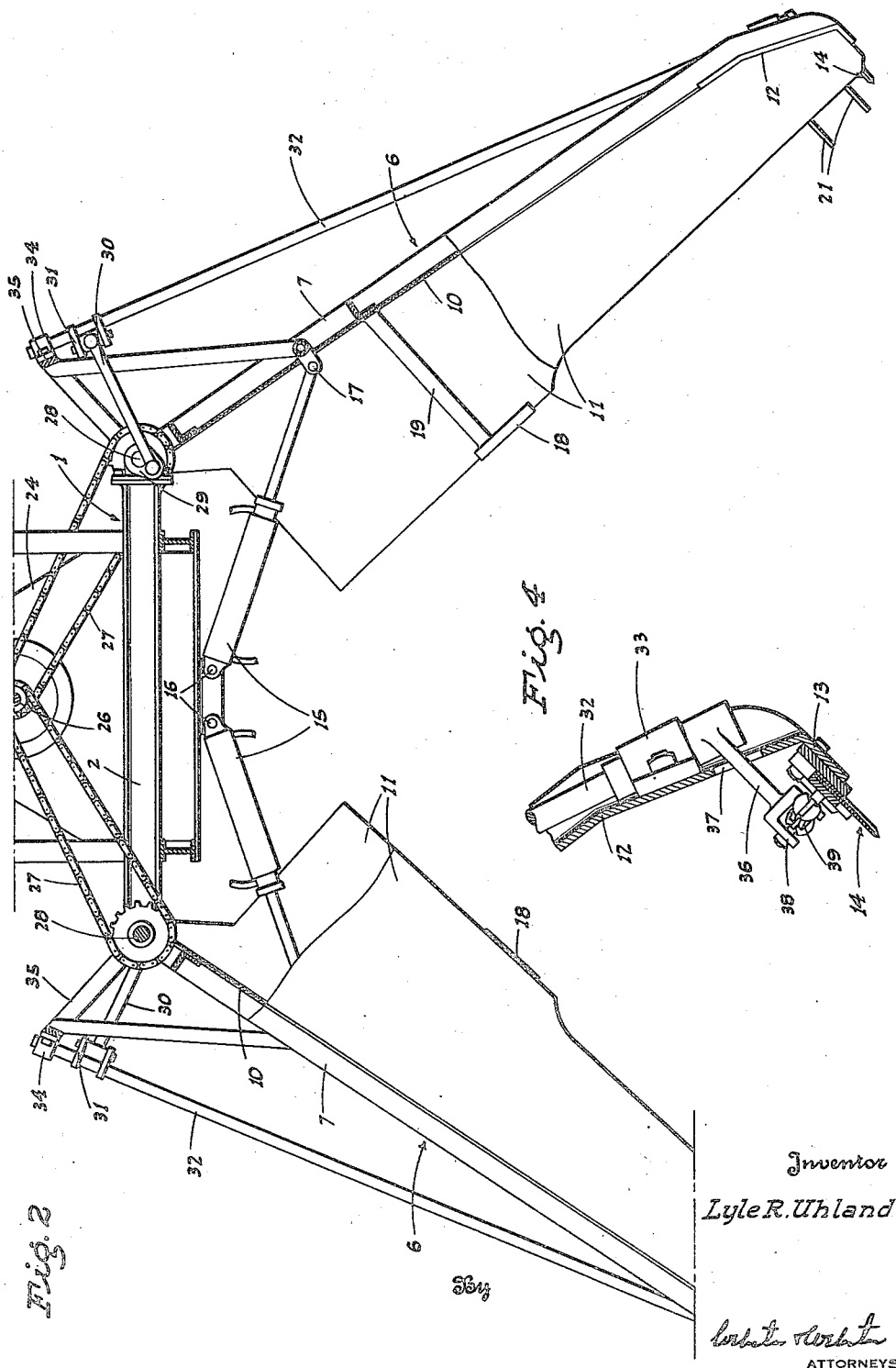
Fig. 2 is a transverse section of the bucket in open position.
Figure 3:
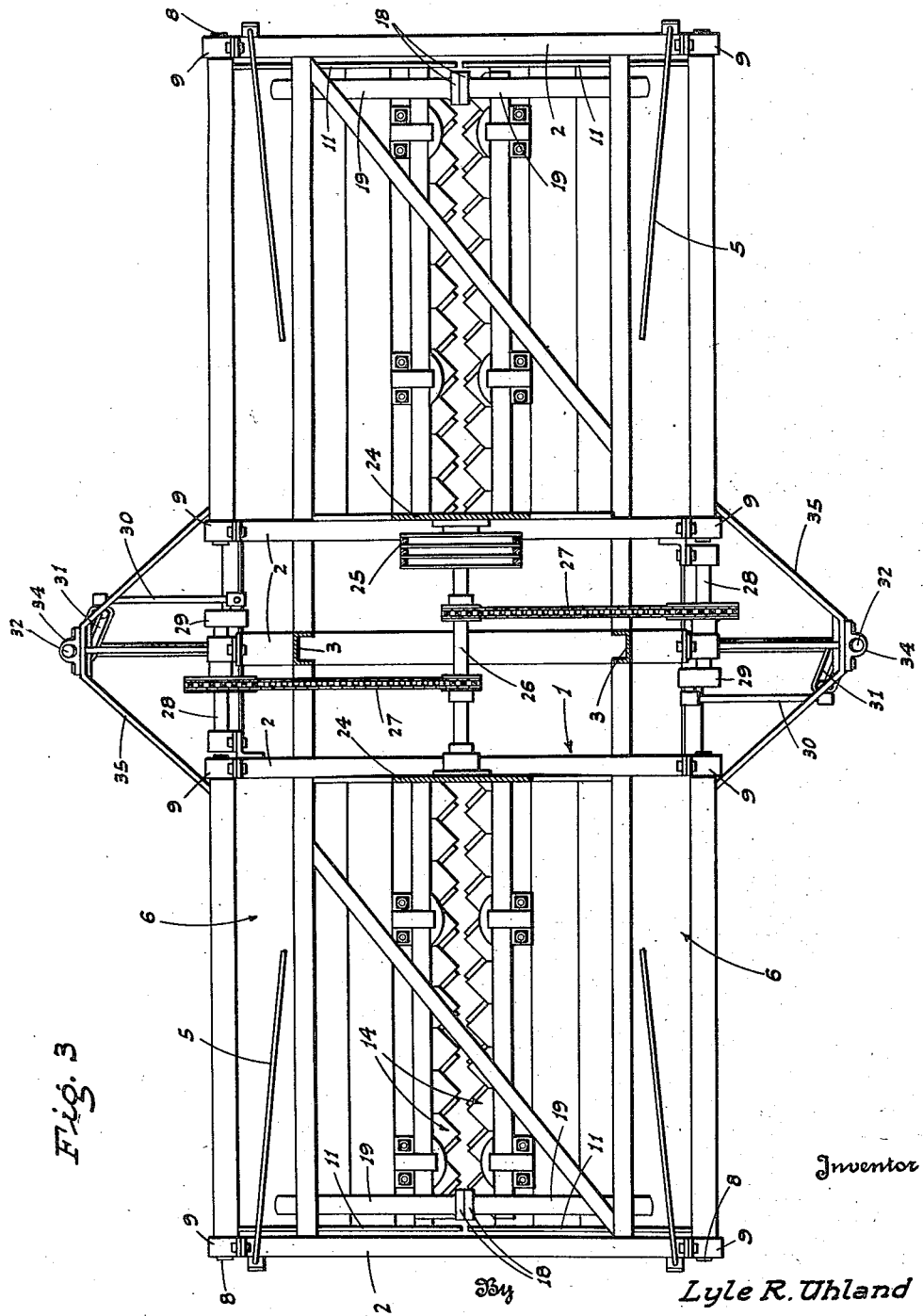
Fig. 3 is a plan view of the bucket in closed position.

A pair of cooperating bucket halves, each indicated at 6, depend from opposite sides of the suspension frame 1, and said bucket halves are pivoted, at their upper edge, to opposite sides of said suspension frame for swinging between open and closed positions, as in Figs. 2 and 1, respectively. The bucket halves 6 are pivotally connected to the suspension frame in the following manner:

Each bucket half 6 includes an upstanding skeleton frame 7, and at the upper end of the latter it is provided with a pair of axially alined top shafts 8 having considerable spacing between the adjacent ends thereof. The top shafts 8 are journaled, at opposite ends, as at 9, to the projecting end portions of the cross beams 2; the latter being properly spaced for this purpose.

Each bucket half 6 includes a face plate 10 affixed to the skeleton frame 7; there being upstanding, transverse end plates 11 at the ends of each bucket half 6; the adjacent end plates 11 working in cooperative relation.

The face plates 10 each include a heavy-duty lower edge portion 12 formed along its lower margin with a downwardly and inwardly inclined mounting flange 13, and a sickle bar 14 is secured to each mounting flange 13, extending therealong for substantially the full width of the bucket. The sickle bars 14, as thus mounted, project toward each other for effective cutting engagement with the lower portion of foliage encompassed by the bucket as it closes; the sickle bar 14 being power driven in the manner hereinafter described.

The bucket halves 6 are power actuated between open and closed positions by a pair of double-acting, fluid pressure actuated power cylinders 15, pivoted, as at 16, to the under side of the suspension frame 1 centrally of its ends and sides; such power cylinders 15 thence diverging downwardly to pivotal connection, as at 17, with the skeleton frame 7 of the corresponding bucket half 6. The power cylinders 15 are interposed in a fluid pressure conduit system which extends to the implement and is there valve-controlled by the operator, whereby said bucket halves 6 may be caused to forcefully open or close upon simultaneous actuation of the cylinders 15.

When the bucket halves 6 are swung by the power cylinders 15 to closed position, such swinging motion is limited to prevent damaging engagement of the sickle bar 14; the limiting means comprising abutting stops 18 on the adjacent ends of alined transverse end bars 19 included in the skeleton frames 7. In addition to serving as the mount for the abutment stops 18, the end bars 19 also stabilize the end plates 11.

Below the abutment stops 18 the adjacent edges of the end plates 11 are cut away slightly, as at 20, to prevent engaged foliage from holding the bucket halves against full closing. However, to prevent foliage from slipping between the gapped lower edges of the end plates 11, said edges are fitted, at the lower portion thereof, with foliage retention pins 21. These retention pins 21 project toward each other, and when the bucket is closed said pins are in vertically spaced, alternately lapping relation. See Fig. 1.

A prime mover, such as a relatively small gasoline engine 22, is supported by a base, indicated generally at 23, which includes spaced end plates 24; such base and end plates being secured in connection with, and upstanding from, the suspension frame 1 within the upstanding lift frame 3.

The engine 22 is connected by an endless belt and pulley unit 25 with a longitudinal countershaft 26 which extends between, and is journaled in connection with, the end plates 24.

In turn, the countershaft 26 drives a pair of endless chain and sprocket units 27 which extend in opposite directions from the countershaft 26 and drive pitman shafts 28 journaled in connection with the suspension frame 1 in axial alinement between the ends of the adjacent top shafts 8. This is an important feature, as it permits the bucket halves 6 to swing between open and closed positions without interfering with the drive of such pitman shafts 28. Each sickle bar 14 is driven from the corresponding pitman shaft 28 by the following mechanism:

Each pitman shaft 28 includes a pitman 29, and the latter is connected to a pitman rod 30 which projects laterally outwardly. The pitman rod 30 universally connects between the pitman 29 and a radial lever 31 on the upper end portion of an upstanding, oscillatory, motion transmitting shaft 32.

The shaft 32 is disposed outwardly of the corresponding face plate 10 whereby not to interfere with operation of the bucket, and said shaft extends from a bottom bearing 33 on the corresponding bucket half 6 upwardly to a top bearing 34 on the outer end of an outrigger frame 35 which projects from the suspension frame 1 adjacent the related pitman rod 30. The upstanding shaft 32 diverges in an upward direction with respect to the corresponding face plate 10; this for the purpose of positioning the upper portion of such shaft a sufficient distance from the pitman 29 for effective connection of the pitman rod 30 with the radial lever 31 on such shaft.

At its lower end the shaft 32 is formed, below the bottom bearing 33, with a rigid lever 36 which projects inwardly through a port 37 to adjacent the corresponding sickle bar 14. At its inner end the lever 36 is formed with a fork 38, and the latter is in turn connected by a universally mounted link 39 with the sickle bar 14 in actuating relation to the latter.

With the above described arrangement it will be recognized that each endless chain and sprocket unit 27, working through the described pitman assembly, oscillates the corresponding shaft 32, and oscillation of the latter is converted by the assembly of lever 36 and link 39 into powered, reciprocating motion of the connected sickle bar 14. Therefore, with the engine 22 in operation, the sickle bars 14 are effectively driven for the purpose of severing foliage.

In operation of the above described foliage removal bucket, such bucket is opened above the foliage, such as tules, in an irrigation ditch or canal, and is then lowered to encompass such foliage. When in its lowered position the bucket halves 6 are forcefully drawn together by the power cylinders 15, and as this occurs the working sickle bars 14 sever the foliage at a relatively low point, so that the load of foliage in the closed bucket can be freely lifted out of the ditch or canal. In this manner the bucket is operative to remove foliage cleanly and without leaving any material amount of root-connected foliage.

The described foliage removal bucket works rapidly and with relative ease to the accomplishment of the desired end, being a practical and reliable device.

From the foregoing description it will be readily seen that there has been produced such a device as substantially fulfills the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A foliage removal bucket comprising a suspension frame, cooperating bucket halves pivotally suspended from the suspension frame for swinging between open and closed positions, a pair of fluid pressure actuated power cylinders pivotally connected to the frame between the bucket halves and thence diverging downwardly to pivotal connection with the same, a sickle bar mounted on each bucket half and extending adjacent the lower edge thereof, a prime mover mounted on the frame, and driving connections between the prime mover and said sickle bars; said connections including driven rotary members whose axis is alined with the axis of swinging motion of the bucket halves.

2. A foliage removal bucket comprising a suspension frame, cooperating bucket halves pivotally suspended from the suspension frame for swinging between open and closed positions, power means to so swing the bucket halves, a sickle bar mounted on and extending along the lower edge portion of each bucket half, an oscillatory motion transmitting shaft journaled in upstanding relation on each bucket, connections between the lower end of each shaft and corresponding sickle bar to reciprocate the latter upon oscillation of said shaft, a prime mover on the frame, and driving connections between the prime mover and said shafts to oscillate the latter.

3. A foliage removal bucket, as in claim 2, in which the driving connections include a driven pitman shaft alined with the axis of swinging of each bucket half, a pitman on each pitman shaft, and a pitman rod universally coupled between each pitman and corresponding upstanding shaft in oscillating relation to the latter.

4. A foliage removal bucket comprising a suspension frame, a pair of opposed bucket halves, means pivotally connecting the bucket halves adjacent their upper edge to the frame in spaced relation, power means between the frame and bucket halves operative to open and close the latter, a sickle bar mounted on and extending along the lower edge portion of each bucket half, said sickle bars projecting laterally inward, power means to drive the sickle bars, and cooperating stop means on the bucket halves in position to prevent closing thereof sufficient to cause engagement of said sickle bars with each other.

5. A foliage removal bucket, as in claim 4, in which said stop means comprises substantially alined, transverse end bars on the bucket halves, and abutment stops on adjacent ends of said end bars.

6. A foliage removal bucket comprising a suspension frame, a pair of opposed bucket halves, means pivotally connecting the bucket halves adjacent their upper edge to the frame in spaced relation, power means between the frame and bucket halves operative to open and close the latter, a sickle bar mounted on and extending along the lower edge portion of each bucket half, said sickle bars projecting laterally inward, power means to drive the sickle bars, and cooperating stop means on the bucket halves in position to prevent closing thereof sufficient to cause engagement of said sickle bars with each other; the bucket halves including upstanding, transversely extending end plates, adjacent edges of the lower portions of said bucket halves being spaced apart when the latter are closed, and foliage retention pins on said edges projecting toward each other in vertically spaced relation, said pins lapping when the bucket halves are closed.

7. A foliage removal bucket comprising a suspension frame, a pair of opposed bucket halves, a pair of spaced but alined pivot shafts on the upper edge of each bucket half, means journaling the shafts of each bucket half to the suspension frame for opening or closing swinging motion of the bucket halves, power means between the frame and bucket halves to so swing the latter, a sickle bar mounted on and extending along the lower edge portion of each bucket half, a prime mover on the frame, and driving connections between the prime mover and sickle bars operative in any position of the bucket halves.

8. A foliage removal bucket comprising a suspension frame, a pair of opposed bucket halves, a pair of spaced but alined pivot shafts on the upper edge of each bucket half, means journaling the shafts of each bucket half to the suspension frame for opening or closing swinging motion of the bucket halves, power means between the frame and bucket halves to so swing the latter, a sickle bar mounted on and extending along the lower edge portion of each bucket half, a prime mover on the frame, and driving connections between the prime mover and sickle bars operative in any position of the bucket halves; said driving connections including a driven shaft journaled on the frame in axial alinement between the adjacent ends of the pivot shaft of each bucket half.

9. A foliage removal bucket comprising a suspension frame, a pair of opposed bucket halves, a pair of spaced but alined pivot shafts on the upper edge of each bucket half, means journaling the shafts of each bucket half to the suspension frame for opening or closing swinging motion of the bucket halves, power means between the frame and bucket halves to so swing the latter, a sickle bar mounted on and extending along the lower edge portion of each bucket half, a prime mover on the frame, a driven shaft journaled on the frame in axial alinement between the adjacent ends of the pivot shafts of each bucket half, driving connections between the prime mover and said driven shafts, an upstanding oscillatory shaft on each bucket half extending substantially full height thereof, a pitman on each driven shaft, a pitman rod assembly connected between each pitman and corresponding upstanding shaft in oscillatory relation to the latter, and connections between the lower end of each upstanding shaft and the corresponding sickle bar operative to convert oscillating motion of the former to reciprocating motion of the latter.

10. A foliage removal bucket comprising a suspension frame, a pair of opposed bucket halves, a pair of spaced but alined pivot shafts on the upper edge of each bucket half, means journaling the shafts of each bucket half to the suspension frame for opening or closing swinging motion of the bucket halves, power means between the frame and bucket halves to so swing the latter, a sickle bar mounted on and extending along the lower edge portion of each bucket half, a prime mover on the frame, a driven shaft journaled on the frame in axial alinement between the adjacent ends of the pivot shafts of each bucket half, driving connections between the prime mover and said driven shafts, an upstanding oscillatory shaft on each bucket half extending substantially full height thereof, a pitman on each driven shaft, a pitman rod assembly connected between each pitman and corresponding upstanding shaft in oscillatory relation to the latter, and connections between the lower end of each upstanding shaft and the corresponding sickle bar operative to convert oscillating motion of the former to reciprocating motion of the latter; there being an outrigger frame projecting from each bucket half adjacent the corresponding driven shaft, the upper end of the related upstanding shaft being journaled in each outrigger frame, and the corresponding pitman rod assembly leading outward with each outrigger frame to connection with said related upstanding shaft.

11. A foliage removal bucket comprising a supporting frame, means for suspending said frame, a pair of opposed bucket halves, each pivoted at its upper end to the supporting frame, power means to selectively swing the halves from a closed position adjacent each other to an open position away from each other, stop means between the bucket halves effective to prevent the lower edges of the bucket from engaging when the bucket halves are in closed position, a reciprocable cutter bar disposed along the lower edge of each bucket half, such stop means additionally functioning to maintain the adjacent cutting edges of the cutter bars in separated relation, and power means mounted on the frame and connected in driving relation with each of the cutter bars and operative to reciprocate the same.

LYLE R. UHLAND.

REFERENCES CITED

The following references are of record in the file of this patent:

UNITED STATES PATENTS

| Number | Name | Date |
|---|---|---|
| 1,839,380 | Druppel | Jan. 5, 1932 |
| 1,997,149 | Lake | Apr. 9, 1935 |